(12) United States Patent
Zhu et al.

(10) Patent No.: US 11,388,444 B2
(45) Date of Patent: Jul. 12, 2022

(54) LOOP FILTERING METHOD BASED ON ADAPTIVE SELF-GUIDED FILTERING

(71) Applicant: University of Electronic Science and Technology of China, Chengdu (CN)

(72) Inventors: Ce Zhu, Chengdu (CN); Lingling Deng, Chengdu (CN); Ni Jiang, Chengdu (CN); Qiuyue Wang, Chengdu (CN); Keke Ding, Chengdu (CN)

(73) Assignee: UNIVERSITY OF ELECTRONIC SCIENCE AND TECHNOLOGY OF CHINA, Chengdu (CN)

( * ) Notice: Subject to any disclaimer, the term of this patent is extended or adjusted under 35 U.S.C. 154(b) by 0 days.

(21) Appl. No.: 17/458,648

(22) Filed: Aug. 27, 2021

(65) Prior Publication Data

US 2021/0392382 A1     Dec. 16, 2021

Related U.S. Application Data

(63) Continuation of application No. PCT/CN2021/070821, filed on Jan. 8, 2021.

(30) Foreign Application Priority Data

Mar. 31, 2020    (CN) .......................... 202010242336.4

(51) Int. Cl.
| | | |
|---|---|---|
| *H04N 19/82* | (2014.01) | |
| *H04N 19/117* | (2014.01) | |
| *H04N 19/182* | (2014.01) | |

(52) U.S. Cl.
CPC ........... *H04N 19/82* (2014.11); *H04N 19/117* (2014.11); *H04N 19/182* (2014.11)

(58) Field of Classification Search
CPC ..... H04N 19/82; H04N 19/117; H04N 19/182
(Continued)

(56) References Cited

FOREIGN PATENT DOCUMENTS

| CN | 101783939 A | 7/2010 |
|---|---|---|
| CN | 103051890 A | 4/2013 |

(Continued)

OTHER PUBLICATIONS

Lingling Deng, Research on the Loop Filter and Rate Distortion Optimization of Versatile Video Coding, A Master Thesis Submitted to University of Electronic Science and Technology of China, 2017, pp. 1-72.

*Primary Examiner* — Amir Shahnami
(74) *Attorney, Agent, or Firm* — Bayramoglu Law Offices LLC

(57) ABSTRACT

A loop filtering method based on an adaptive self-guided filtering is mainly an adaptive self-guided filtering technology considering local structure information of an image, wherein a regularization coefficient is adjusted by calculating a weight coefficient of the regularization coefficient to realize the adaptive self-guide filtering, and then a region-level subspace mapping iterative optimization implemented on each region enables a mapping result of the each region to be optimal, wherein the mapping result of a whole image is closer to an original image. Beneficial effects of the loop filtering method are as follows: a filtering effect of a loop filtering is improved, a distortion effect of a reconstruction image is reduced and a reconstruction quality of a video frame is improved, wherein the reconstruction image is more favorable for a subsequent reference and a subjective and objective quality of the video is further improved.

1 Claim, 2 Drawing Sheets

(58) Field of Classification Search
USPC .................................................. 375/240.02
See application file for complete search history.

(56) References Cited

FOREIGN PATENT DOCUMENTS

| | | |
|---|---|---|
| CN | 104735450 A | 6/2015 |
| CN | 105791877 A | 7/2016 |
| CN | 111314711 A | 6/2020 |

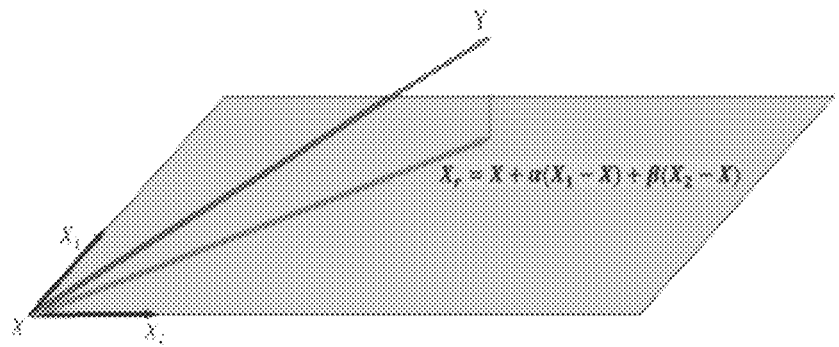

FIG. 1

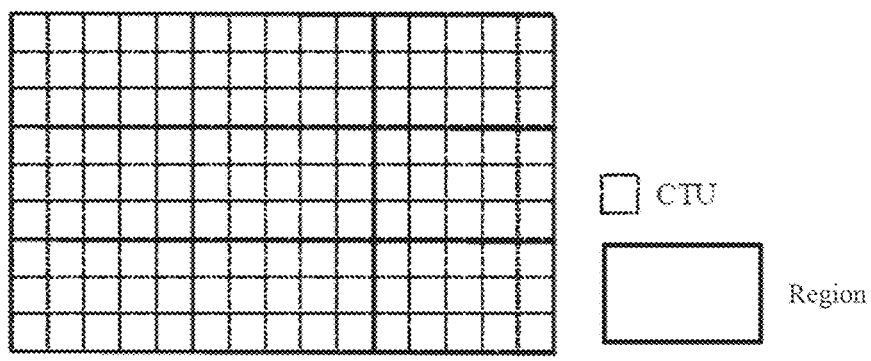

FIG. 2

Step I: setting filtering mark CTU_flag=1 for all the CTU in the region and calculating a mapping coefficient Step II: performing subspace mapping on the CTU of which the CTU_flag is 1 and using the rate distortion cost to decide whether to set the current CTU_flag as 0

Step III: if the CTU_flag is set from 1 to 0, re-calculating the mapping coefficient for all the CTU of which the CTU_flag is 1, and returning to the step II Step IV: if CTU_flag does not change or the number of iterations reaches to 5 in the step III, performing subspace mapping on the CTU of which the CTU_flag is 1 by using the Step V: using the rate distortion cost to decide whether to filter the current region

FIG. 3

LOOP FILTERING METHOD BASED ON ADAPTIVE SELF-GUIDED FILTERING

CROSS REFERENCE TO THE RELATED APPLICATIONS

This application is a continuation application of International Application No. PCT/CN2021/070821, filed on Jan. 8, 2021, which is based upon and claims priority to Chinese Patent Application No. 202010242336.4, filed on Mar. 31, 2020, the entire contents of which are incorporated herein by reference.

TECHNICAL FIELD

The present invention belongs to the technical field of video coding and decoding, and in particular, relates to a loop filtering method based on adaptive self-guided filtering.

BACKGROUND

A block-based hybrid coding frame in the mainstream video coding standard will lead to distortion effect such as block effect, ringing effect and image blurring in the reconstruction image. The loop filtering technology filters the coded reconstruction image, thereby reducing the influence of the distortion effect on the video reconstruction quality and improving the subjective and objective quality of the video. After the reconstruction image is filtered, the quality of the current reconstruction image is improved and reference is provided for the subsequent coding image. Compared with the image before filtering, the reconstruction image after filtering is more favorable for reference, thereby further reducing the prediction residual error of the subsequent coding and improving the coding efficiency.

The distorted image may be regarded as the superposition of the original image and noise, and the purpose of filtering is to remove the noise from the distorted image, thereby obtaining the original image. Since the natural image consists of a gentle region and texture details, the important texture details in the distorted image will be smoothed while the noise in the image is smoothed by the filter. Based on this problem, researches proposed many edge-preserving filters, such as bilateral filter (BF), a Wiener filter (WF), a guided filter (GF) and the like.

"Guided" in the guided filter refers to that in the process of filtering a to-be-filtered image p to obtain an output image q, it is necessary to use a guide image I, and for the self-guided filter, the guide image is the to-be-filtered image itself. An important assumption of the guided filter is that the guide image I and the output image q present a local linear relationship at the filtering window, that is, the output at the pixel i may be represented by the following formula:

$$q_i = a_k I_i + b_k, \forall i \in \omega_k \tag{0.1}$$

Since the to-be-filtered image p may be regarded as a degraded image which is produced the noise pollution of the output image q. Assuming that the noise is n, $q_i = p_i - n_i$.

The coefficient $a_k$ and the intercept $b_k$ of a local linear model in a filtering window $(2r+1) \times (2r+1)$ may be calculated by solving min $n^2$:

$$a_k = \frac{\sigma_k^2}{\sigma_k^2 + \varepsilon} \tag{0.2}$$

$$b_k = (1 - a_k)\mu_k \tag{0.3}$$

wherein, $\sigma_k^2$ and $\mu k$ are a variance and an average value of a guide image pixel in a filtering window $\omega_k$, and $\varepsilon$ is a regularization coefficient for punishing the larger coefficient $a_k$.

When $\varepsilon=0$, $a_k=1$ and $b_k=0$, the output image pixel is equal to the guide image pixel at this time; and when $\varepsilon>0$, there are two cases as follows:

Case 1: in the region with larger $\sigma_k^2$, a picture changes dramatically in the filtering window $\omega_k$. At this time, $\sigma_k^2 \gg \varepsilon$, so $a_k \approx 1$, $b_k \approx 0$, $q \approx p$, and an edge of the image is retained.

Case 2: $\sigma_k^2$ In the smaller region, a picture is almost unchanged in the filtering window $\omega_k$. At this time, $\sigma_k^2 \gg \varepsilon$, so $a_k \approx 1$, $b_k \approx \mu_k$, $q \approx \mu_k$, and an image region is smoothed.

A double self-guided filtering technology based on subspace projection is introduced in the process of formulating the AV1 video coding standard, thereby further improving the coding efficiency. In this technology, two groups of self-guided filters are used to filter the reconstruction image X to obtain two filtering images $X_1$ and $X_2$. The obtained projection $X_r$ is closer to a real image Y by projecting a difference vector of the real time Y and the reconstruction image X to a subspace generated by a difference vector $(X_1-X)$ of $X_1$ and X and a difference vector $(X_2-X)$ of $X_2$ and X. $X_r-X$ may be represented linearly by $X_1-X$ and $X_2-X$, so $X_r$ may be represented as:

$$X_r = X + \alpha(X_1 - X) + \beta(X_2 - X) \tag{0.4}$$

When the encoder gives the original image Y, the tip-be-filtered reconstruction image X and the filtering images $X_1$ and $X_2$, parameters $\alpha$ and $\beta$ may be calculated according to the least square solution of a matrix equation:

$$\{\alpha, \beta\}^T = (A^T A)^{-1} A^T b \tag{0.5}$$

wherein $A=\{X_1-X, X_2-X\}$, $b=Y-X$, and the image matrices in the formula (1.5) are all represented as column vectors.

The schematic diagram of subspace mapping is shown in FIG. 1. The self-guided filter parameter and the mapping coefficient are transmitted to the decoding end, and the reconstruction image may be filtered at the decoding end.

Compared with HEVC, JVET has added the ALF technology to the latest video coding standard VCC which is being developed and greatly improves the coding efficiency, but various distortion effect in the reconstruction image are still not removed completely; therefore, further reducing the distortion in the reconstruction image is still the important requirement in the development process of the video coding technology. Meanwhile, the original double self-guided filtering technology is not suitable for the VVC standard aiming at the high-definition and ultrahigh-definition videos.

SUMMARY

In view of the above problem, the present invention further enhances the video quality by improving a double self-guided filtering technology. According to the present invention, a loop filtering method based on adaptive self-guide filtering mainly includes: realizing adaptive adjustment of a regularization coefficient ε of a self-guided filter and region level mapping iterative optimization.

The present invention adopts the following technical solution: a loop filtering method based on adaptive self-guided filtering, wherein an adaptive self-guided filter can utilize local structure information of a reconstruction image to effectively remove quantification noise while avoiding excessive smoothness of the edge of the image; meanwhile, iteratively optimized subspace mapping ensures that the filtering result of the subspace mapping is close enough to the original image. The filtering method based on adaptive self-guided filtering includes the following steps:

I. Adaptive Self-Guided Filtering Operation Implemented on the Reconstruction Image:

in the prior art, the whole reconstruction image is filtered by a relatively original self-guided filter, and it is very inefficient to enhance the quality of the reconstruction image by such a filtering strategy, resulting in unideal mapping result obtained by subsequent subspace mapping. If the self-guided filter may be improved to make the filtering result closer to the original image, the filtering result obtained by the finally mapping will be closer to the original image and the filtering effect, will be further improved. Since the self-guided filter is only determined by two parameters $\{r, \varepsilon\}$, the increase of the filtering radius r will only make the filtering result smoother, but it is usually necessary to highlight the texture details of the image; therefore, the optimization of the regularization coefficient ε may be considered. The ε of the self-guided filter used in the prior art is fixed for all the pixels in one image. If a higher ε is used, the texture region will be excessively smooth, while a lower ε is difficult to ensure that the flat region is smooth enough, so the ε c is difficult to balance the two problems. Therefore, the present invention provides an adaptive self-guided filtering technology considering the local structure information of an image.

A self-guided filtering parameter table is set at a coding end and a decoding end to store 32 groups of adaptive filtering parameters $\{r_1, \varepsilon_1, r_2, \varepsilon_2\}$ in pairs, an image level filtering mark is initialized as 1, a reconstruction image is filtered by using each group of adaptive filtering parameters to obtain two filtering results $X_1$ and $X_2$, an encoder first calculates the local structure information of the current to-be-filtered reconstruction image by using a Sobel operator during filtering, convolutes a Sobel operator of 3×3 and the reconstruction image, calculates transverse and longitudinal pixel gradients respectively, and estimates the edge information of the current reconstruction information:

$$G_x = \begin{bmatrix} -1 & 0 & +1 \\ -2 & 0 & +2 \\ -1 & 0 & +1 \end{bmatrix} * X \ G_y = \begin{bmatrix} -1 & -2 & -1 \\ 0 & 0 & 0 \\ +1 & +2 & +1 \end{bmatrix} * X \quad (0.6)$$

the transverse gradient and the longitudinal gradient are combined:

$$G = \sqrt{G_x^2 + G_y^2} \quad (0.7)$$

for one group of filtering parameters $\{r_1, \varepsilon_1\}$ and $\{r_2, \varepsilon_2\}$ in the filtering parameter table, a regularization coefficient ε is subjected to adaptive adjustment by using G representing the edge information.

$$S = \frac{G_i + \gamma}{\frac{1}{|\omega|} \sum_{p=1}^{\omega_i} G_p + \gamma} \quad (0.8)$$

$$a_k = \frac{\sigma_k^2}{\sigma_k^2 + \frac{\varepsilon}{s}} \quad (0.9)$$

s is a weight coefficient of the regularization coefficient at a pixel i, $\omega_i$ is a filtering window centered on the pixel i, and γ is a constant with a value of 0.01. If the pixel i is located at a strong edge of the image, s is always greater than 1; and if the pixel i is located at a flat region of the image, s is always less than 1. After the regularization coefficient ε is adjusted by the parameter s, the adaptive self-guided filter has the following characteristics: at the strong edge, ε will become smaller, $a_k$ is closer to 1 and more textures will be retained; and at the flat region, ε will become larger, $a_k$ is closer 0 and $b_k$ is closer to a pixel average value $\mu_k$ of the filtering window, so that the flat region is smoother.

The adaptive self-guided filter provided by the present invention can effectively improve the quality of two filtering images $X_1$ and $X_2$ by filtering the reconstruction image, is more beneficial to the subsequent subspace mapping, reduces the value of a mapping coefficient, is favorable for reducing the number of bits required when the coding end transmits the mapping coefficient, and improves the coding efficiency.

II. Region Level Subspace Mapping Iterative Optimization:

The double self-guide filtering technology in the existing AV1 video coding standard only use one pair of mapping coefficients $\{\alpha, \beta\}$ for the whole reconstruction image; however, for a high-resolution video such as 4K video, and the video size is large, the video content changes greatly, it is not closer enough to the original image only depending on the mapping results of one pair of mapping coefficients $\{\alpha, \beta\}$. If a large-size image may be segmented into a plurality of non-overlapping regions, different mapping coefficients are adopted for each region and whether to filter the current region is recorded by using a region level filtering mark, the mapping effect of each region is better, so that the filtering effect of the whole picture is improved. Therefore, the present invention proposes a region level subspace iterative optimization technology.

The region level subspace mapping iterative optimization implemented on each region includes the following steps:

S1: segmenting the image into a plurality of regions which have the same size and do not overlap each other, aligning boundaries of the regions with a boundary of CTU, and initializing a region level filtering mark as 1.

S2: initializing a CTU-level filtering mark of the CTU in each region as 1, and calculating a mapping coefficient of each region according to a formula (1.5).

S3: substituting the mapping coefficient $\{\alpha, \beta\}$ obtained in S2 into a formula (1.4) to obtain a mapping result $X_r$, only performing space mapping operation on the CTU of which each filtering mark is 1 in the region, deciding whether to use the filter for each CTU in the current region according to RDO, and setting the CTU-level filtering mark of the CTU as 0 if deciding not to use the filter.

S4: judging whether there is a CTU-level filtering mark of the CTU set from 1 to 0 in the region, if yes, re-calculating the region level mapping coefficient {α, β} fill for the CTU of which the remaining CTU-level filtering mark is 1 in the region, returning to the step S3 until the filter mark of the CTU in the region is no longer changed or the number of iterations reaches 5, determining {α, β} otherwise, entering a step S5.

S5: mapping the CTU of which the filtering mark is 1 in the region according to the mapping coefficient {α, β} finally obtained after iterative optimization, deciding whether to perform filtering operation on the current region by comparing rate distortion costs before and after the use of the adaptive self-guided filter and region level subspace mapping iterative optimization, setting the region level filtering mark as 1 when the current region is filtered, otherwise setting the region level filtering mark as 0.

After region level subspace mapping iterative optimization is implemented on each region, the mapping result of each region is optimal, so that the mapping result of the whole image is closer to the original image, especially for the large-size reconstruction image, the quality of the reconstruction image is further improved. Therefore, a large amount of additional filtering information is brought and requires effective coding.

III: Filtering Additional Information Entropy Coding:

if the optimal rate distortion cost RDCost1 obtained by traversing 32 groups of filtering parameters in the self-guided filter parameter table to perform adaptive self-guide filtering and region level subspace iterative optimization is still higher and still than the rate distortion cost RDCost0 not using the filter, the image level filtering mark of the reconstruction image is set as 0, otherwise the image level filtering mark is set as 1, and related information of the filter is transmitted to the decoding end.

Whether the image level filtering mark is 0 is judged. If yes, a code word of 0 is transmitted to the decoding end to inform the decoding end that it is unnecessary to implement filtering operation on the current reconstruction image. Otherwise, a code word of 1 is transmitted to the decoding end and the related information of the filter is transmitted at the same time, wherein the information includes: an optimal filtering parameter index obtained by traversing the filtering parameter table according to the RDO, the region level filtering mark of each region, the CTU-level filtering mark of each CTU in the region and the region level mapping coefficient {α, β} of all the regions.

The mapping coefficients {α, β} of each region are basically distributed in [−5, +5]. Therefore, for the integer part of the coefficient, zero-order index Columbus coding is directly used; and the decimal part of the coefficient is represented by 6-bit precision, that is, the decimal part is shifted to the left by 6 bits and then rounded, and the zero-order index Columbus coding is used, so coding a mapping coefficient requires 9-bit code words at most.

The specific method of the self-guided filtering is to perform adaptive adjustment on the decisive parameter regularization coefficient of the self-guided filter to realize an adaptive self-guided filter based on local structure information of the reconstruction image, and adopt subspace mapping iterative optimization on the filtering result of the adaptive self-guided filter to further reduce the difference between the filtering image and the original image and improve the quality of the reconstruction image.

When the decoding end reconstructs a coding image, an image level filtering mark bit of the current reconstruction image is decoded first, if the image level filtering mark is 0, it means that the current reconstruction image does not need to be filtered and no operation is performed on the reconstruction image at this time; if the frame level filtering mark is 1, it is also necessary to continuously decode the self-guided filtering parameter index, the filtering parameter corresponding to the decoded index is found from the self-guided filtering parameter table, the filtering parameter is used to perform adaptive self-guide filtering to obtain two filtering results $X_1$ and $X_2$. Like the coding end, the reconstruction image is divided into a plurality of regions with consistent size, the region level filtering mark bit of each region and the region level mapping coefficient are continuously decoded, it is necessary to further decode the CTU-level filtering mark for the region of which the region level filtering mark is 1, a reconstruction pixel before filtering is used as the reconstruction pixel of the CTU if the filtering mark of the CTU is 0, and if the filtering mark of the CTU is 1, subspace mapping of two groups of adaptive self-guided filtering results of the CTU is realized by using the corresponding region level mapping coefficient, and the final reconstruction image of the CTU is replaced by the filtered reconstruction pixel.

The rate distortion cost calculation formula is DCost=D+λR, wherein D represents the distortion of the current coding unit, R represents the number of bits consumed by information required by implementing filtering operation in the art of the present invention on the current coding unit by coding, and λ is a Lagrange multiplier and is determined by the encoder.

The beneficial effects of the present invention are as follows: the filtering Invention effect of loop filtering can be improved, the distortion effect of a reconstruction image can be reduced and the reconstruction quality of a video frame can be improved, so that the reconstruction image is more favorable for subsequent reference and the subjective and objective quality of the video is further improved.

BRIEF DESCRIPTION OF THE DRAWINGS

FIG. 1 is an operable rate distortion curve.
FIG. 2 is a construction schematic diagram of a temporal domain distortion propagation chain under an LD structure.
FIG. 3 is a schematic diagram of an LD coding structure.

DETAILED DESCRIPTION OF THE EMBODIMENTS

Figure 4:
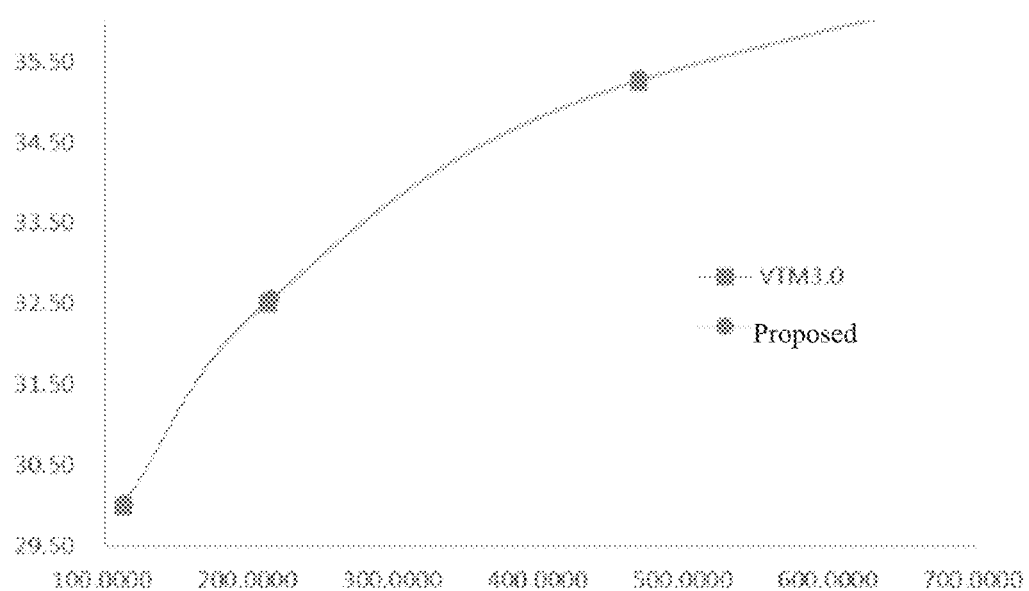
FIG. 4 is a rate distortion curve diagram of a Fourpeople sequence.

The effectiveness of the solution of the present invention is described below by using simulation examples:

taking VTM3.0 as an experimental platform, a double self-guided filtering algorithm based on VVC optimization proposed herein is added between SAO and ALF in a loop filtering module and is verified under AI, LD and RA configuration. The test conditions are the common test conditions (CTC) of the VTM, including 22 sequences such as Class A-Class F. The test result shows the coding performance of each test sequence, the performance average value of each Class and the performance average values of all the test sequence. The quantification parameters QP of the test are 22, 27, 32 and 37.

The experimental result is compared with the original reference software VTM3.0. BD-Rate serves as a comparison standard to represent the change of the code rate under the same reconstruction quality. When the BD-Rate is negative, it means that the code rate decreases under the same reconstruction quality and the technology has gain; and when the BD-Rate is positive, it means that the code rate increases under the same reconstruction quality and the technology has a loss. Table 1 shows the BD-Rate of the brightness Y components of the present invention under three coding configurations of AI, LB and RA compared with the VTM3.0. It may be obviously seen that the coding performance of the present invention is improved under the coding configurations of AI, LB and RA. Under the AI coding structure, the code rate of the brightness component is saved averagely by 0.23%; under the LDB coding structure, the code rate of the brightness component is saved averagely by 0.16%; and under the RA coding structure, the code rate of the brightness component is saved averagely by 0.23%.

TABLE 1

Code rate saving of the present invention compared with the VTM3.0

| Class | Sequence name | Resolution rate | Y BD-rate (%) AI | LB | RA |
|---|---|---|---|---|---|
| A1 | Tango2 | 4K | 0.18 | | 0.09 |
| | FoodMarket4 | 3840 × 2160 | 0.11 | | 0.02 |
| | Campfire | | −0.09 | | −0.11 |
| | Average | | 0.06 | | 0.0 |
| A2 | CatRobot1 | 4K | −0.28 | | −0.33 |
| | DaylightRoad2 | 3840 × 2160 | −0.01 | | 0.17 |
| | ParkRunning3 | | −0.36 | | −0.17 |
| | Average | | −0.22 | | −0.11 |
| B | MarketPlace | 1080P | −0.14 | −0.28 | −0.17 |
| | RitualDance | 1920 × 1080 | −0.15 | −0.19 | −0.12 |
| | Cactus | | −0.12 | −0.16 | −0.16 |
| | BasketballDrive | | −0.06 | −0.29 | −0.12 |
| | BQTerrace | | −0.23 | −0.12 | −0.49 |
| | Average | | −0.14 | −0.21 | −0.21 |
| C | BasketballDrill | WVGA | −0.69 | −0.16 | −0.38 |
| | BQMall | 832 × 480 | −0.32 | −0.09 | −0.21 |
| | PartyScene | | −0.34 | 0.06 | −0.36 |
| | RaceHorses | | −0.30 | −0.25 | −0.28 |
| | Average | | −0.41 | −0.11 | −0.31 |
| D | BasketballPass | WQVGA | −0.19 | −0.22 | −0.05 |
| | BQSquare | 416 × 240 | −0.59 | −0.11 | −1.07 |
| | BlowingBubbles | | −0.25 | −0.16 | −0.29 |
| | RaceHorses | | −0.38 | −0.42 | −0.29 |
| | Average | | −0.35 | −0.23 | −0.42 |
| E | FourPeople | 720P | −0.47 | 0.15 | |
| | Johnny | 1280 × 720 | −0.13 | −0.35 | |
| | KristenAndSara | | −0.35 | −0.08 | |
| | Average | | −0.31 | −0.04 | |
| Overall average | | | −0.23 | −0.16 | −0.23 |

In the rate distortion curve of the BQSquare sequence shown in FIG. 4, the x-coordinate represents the code rate required for coding the video sequence, the y-coordinate represents PSNR of the Y component of the compressed video sequence, the blue line represents the rate distortion curve of the BQSquare sequence coded after the loop filtering algorithm proposed in this section is introduced, and the release marking curve represents the rate distortion curve of the coded BQSquare of the original VTM3.0. It may be seen from FIG. 4 that the algorithm brings a certain coding improvement in the brightness component.

In the aspect of the coding complexity, it is measured by the coding time increase percentage:

$$\Delta EncT = \frac{T_{Prop} - T_{Org}}{T_{Org}} \times 100\% \quad (0.10)$$

TABLE 2

The coding time increase percentage of the present invention compared with the VTM3.0

| | Sequence | | | | | | |
|---|---|---|---|---|---|---|---|
| Configuration | Class A1 | Class A2 | Class B | Class C | Class D | Class E | Overall average ΔEncT |
| AI | 24% | 6% | 5% | 2% | 1% | 6% | 7% |
| RA | 5% | 5% | 4% | 3% | 3% | | 4% |
| LDB | | | 4% | 1% | 3% | 9% | 4% |

According to the algorithm, the coding complexity under the AI, RA and LDB coding structures are increased by 7%, 4% and 4% respectively; moreover, with the increase of the video size, the coding time increases more, which is due to the fact that the self-guided filter needs to filter each reconstruction pixel, and larger video size has more reconstruction pixels, resulting in the increased time expenditure.

What is claimed is:
1. A loop filtering method based on an adaptive self-guided filtering, comprising the following steps:
S1: performing the adaptive self-guided filtering on a reconstruction image, specifically comprising:
respectively setting a self-guided filtering parameter table at a coding end and a decoding end to store 32 groups of adaptive filtering parameters $\{r_1, \varepsilon_1, r_2, \varepsilon_2\}$ in pairs, initializing an image level filtering mark as 1, performing the adaptive self-guided filtering on a reconstruction image X by using each group of the adaptive filtering parameters to obtain two filtering results $X_1$ and $X_2$, firstly calculating, by an encoder, local structure information of a current to-be-filtered reconstruction image by using a Sobel operator during filtering, then convoluting the Sobel operator of 3×3 and the reconstruction image X, and calculating a transverse pixel gradient $G_x$ and a longitudinal pixel gradient $G_y$ respectively, by the following formulas:

$$G_x = \begin{bmatrix} -1 & 0 & +1 \\ -2 & 0 & +2 \\ -1 & 0 & +1 \end{bmatrix} * X; G_y = \begin{bmatrix} -1 & -2 & -1 \\ 0 & 0 & 0 \\ +1 & +2 & +1 \end{bmatrix} * X;$$

estimating edge information of a current reconstruction image by combining the transverse pixel gradient $G_x$ and the longitudinal pixel gradient $G_y$ by the following formula:

$$G = \sqrt{G_x^2 + G_y^2};$$

for one group of the adaptive filtering parameters $\{r_1, \varepsilon_1\}$ and $\{r_2, \varepsilon_2\}$ in the self-guided filtering parameter table, performing an adaptive adjustment on a regularization coefficient ε adaptive by using G representing the edge information by the following formulas:

$$s = \frac{G_i + \gamma}{\frac{1}{|\omega|}\sum_{p=1}^{\omega_i} G_p + \gamma};$$

-continued $$a_k = \frac{\sigma_k^2}{\sigma_k^2 + \frac{\varepsilon}{s}};$$

wherein s is a weight coefficient of the regularization coefficient ε at a pixel i, $\omega_i$ is a filtering window centering at the pixel i, and γ is a constant with a value of 0.01; s is always greater than 1 when the pixel i is located at a strong edge of the reconstruction image X, s is always less than 1 when the pixel i is located at a flat region of the reconstruction image X, and an adaptive self-guided filter after the regularization coefficient ε is adjusted by a parameter s has the following characteristics:

at the strong edge, the regularization coefficient ε becomes smaller $a_k$ is closer to 1 and more textures are retained;

in the flat region, the regularization coefficient ε becomes larger, $a_k$ is closer to 0, and $b_k=(1-a_k)\mu_k$, that is, $b_k$ is closer to an average pixel value $\mu_k$ of the filtering window, wherein the flat region is smoother; $a_k$ is a coefficient of a local linear model in the filtering window, $b_k$ is an intercept of the local linear model in the filtering window, a to-be-filtered pixel and an output pixel in the filtering window has the local linear model, and an output pixel $q_i$ at the pixel i is obtained according to the local linear model by the following formulas:

$$q_i = a_k I_i + b_k \cdot \forall i \in \omega_k;$$

wherein $I_i$ is a guide image;

S2: implementing a region-level subspace mapping iteration on each region, specifically comprising:

S21: segmenting the reconstruction image X into a plurality of regions, wherein the plurality of regions have identical size and do not overlap each other, aligning boundaries of the plurality of regions with a boundary of a coding tree unit (CTU), and initializing a region-level filtering mark as 1;

S22: initializing a CTU-level filtering mark of the CTU in the each region as 1, and calculating a mapping coefficient of the each region according to formula (1):

$$\{\alpha,\beta\}^T = (A^T A)^{-1} A^T b \qquad (1);$$

wherein A={$X_1$-X, $X_2$-X}, b=Y-X, image matrixes in formula (1) are column vectors, and Y is an original image;

S23: substituting the mapping coefficient {α, β} obtained in S22 into formula (2)

$$X_r = X + \alpha(X_1 - X) + \beta(X_2 - X); \qquad (2)$$

to obtain a mapping result $X_r$, only performing a subspace mapping operation on each CTU with the CTU-level filtering mark of 1 in the each region, determining whether to use the adaptive self-guided filter for the each CTU in a current region according to an RDO, and setting the CTU-level filtering mark of the each CTU as 0 when the CTU-level filtering mark of the each CTU is determined not to use the adaptive self-guided filter;

S24: judging whether there is the CTU-level filtering mark of the each CTU set from 1 to 0 in the each region, when yes, re-calculating a region level mapping coefficient {α, β} for the each CTU of the region level mapping coefficient {α, β} a remaining CTU-level filtering mark is 1 in the each region, returning to the step S23 until the CTU-level filtering mark of the each CTU in the each region is no longer changed or a number of iterations reaches 5 and {α, β} is determined, otherwise, entering a step S25;

S25: mapping the each CTU of the region level mapping coefficient {α, β} the CTU-level filtering mark is 1 in the each region according to the region level mapping coefficient {α, β} finally obtained after an iterative optimization, determining whether to perform a filtering operation on the current region by comparing rate distortion costs before and after a use of the adaptive self-guided filter and region level subspace mapping iterative optimization, setting the region level filtering mark as 1 when the current region is filtered, otherwise setting the region level filtering mark as 0; and a calculation formula of a rate distortion cost is RDCost=D+λR, wherein D represents a distortion of a current coding unit, R represents a number of bits consumed by information required by implementing the filtering operation on the current coding unit by coding, and λ is a Lagrange multiplier and is determined by the encoder;

S3: filtering additional information entropy coding:

S31: if an optimal rate distortion cost RDCost1 obtained by traversing 32 groups of the adaptive filtering parameters in the self-guided filter parameter table to perform the adaptive self-guide filtering and the region level subspace mapping optimization is higher than a rate distortion cost RDCost0 without using the adaptive self-guided filter, setting the image level filtering mark of the reconstruction image X as 0, otherwise setting the image level filtering mark as 1;

S32: judging whether the image level filtering mark is 0, when yes, transmitting a code word of 0 to the decoding end to inform the decoding end to implementing the filtering operation on the current reconstruction image; otherwise, transmitting a code word of 1 to the decoding end and transmitting information of the adaptive self-guided filter at a same time, wherein the information comprises: an optimal filtering parameter index obtained by traversing the self-guided filtering parameter table according to the RDO, the region-level filtering mark of the each region, the CTU-level filtering mark of the each CTU in the each region and the region level mapping coefficient {α, β} of the plurality of regions; and S4: when the decoding end reconstructs a coding image, firstly decoding an image level filtering mark bit of the current reconstruction image, wherein when the image level filtering mark is 0, the current reconstruction image does not need to be filtered and no operation is performed on the reconstruction image X at this time; if the image level filtering mark is 1, a self-guided filtering parameter index is continuously decoded, the self-guided filtering parameter corresponding to a decoded index is found from the self-guided filtering parameter table, the self-guided filtering parameter is used to perform the adaptive self-guide filtering to obtain the two filtering results $X_1$ and $X_2$; like the coding end, dividing the reconstruction image X into the plurality of regions with a consistent size, continuously decoding the region-level filtering mark bit of the each region and the region level mapping coefficient, wherein the CTU-level filtering mark for the each region of the region level mapping coefficient the region-level filtering mark is 1 is further decoded, a reconstruction pixel before filtering is used as the reconstruction pixel of the each CTU when the CTU-level filtering mark of the each CTU is 0, and when the CTU-level filtering mark of the each CTU is 1, sub-space mapping of two groups of adaptive self-guided filtering results of the each CTU is realized by using a corresponding region level mapping coefficient, and the final reconstruction image of the each CTU is replaced by a filtered reconstruction pixel.

\* \* \* \* \*